United States Patent [19]

Enz et al.

[11] 4,089,125
[45] May 16, 1978

[54] COLOR-ASSIST TEACHING AID AND METHOD THEREFOR

[76] Inventors: Vera G. Enz, 132 Burton Pl., Edmond, Okla. 73034; Philip I. Enz, 279 S. Downey, Indianapolis, Ind. 46219

[21] Appl. No.: 749,451

[22] Filed: Dec. 10, 1976

[51] Int. Cl.$^2$ ............................................. G09B 3/00
[52] U.S. Cl. .................................. 35/8 R; 35/DIG. 3; 35/48 R; 35/69
[58] Field of Search ............. 35/8 R, 9 E, 9 F, 31 R, 35/48 R, 69, DIG. 3; 40/106.1

[56] References Cited

U.S. PATENT DOCUMENTS

| | | | |
|---|---|---|---|
| 1,405,010 | 1/1922 | Russell | 35/69 |
| 2,562,633 | 7/1951 | Needham | 35/69 X |
| 2,959,871 | 11/1960 | Honkavaara | 35/69 X |
| 3,154,863 | 11/1964 | La Prelle | 35/9 R |
| 3,228,121 | 1/1966 | Tusson | 35/9 E X |
| 3,253,358 | 5/1966 | Wright | 35/8 R |
| 3,304,627 | 2/1967 | Cella | 35/8 R |
| 3,372,505 | 3/1968 | Wright | 40/106.1 X |
| 3,450,408 | 6/1969 | Hagerman | 35/69 X |
| 3,452,454 | 7/1969 | Easton et al. | 35/31 R |
| 3,500,555 | 3/1970 | Best | 35/8 R |

*Primary Examiner*—William H. Grieb
*Attorney, Agent, or Firm*—Woodard, Weikart, Emhardt & Naughton

[57] ABSTRACT

A teaching aid employing color as a means of communication between teacher and student. The method includes the step of having the teacher ask the students a question while displaying a plurality of answers with each answer being coded with a particular color. Each student is provided with a multi-sided colored block so as to turn the color toward the teacher corresponding to the color of the correct answer displayed. A transparent sheet having a color grid thereon is positioned on projecting means. Another transparent sheet having a plurality of answers thereon is sized to fit atop the color grid so as to position a separate answer in each colored portion of the grid.

4 Claims, 4 Drawing Figures

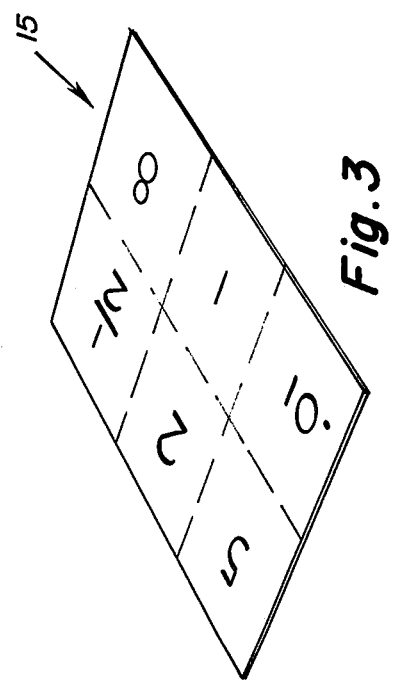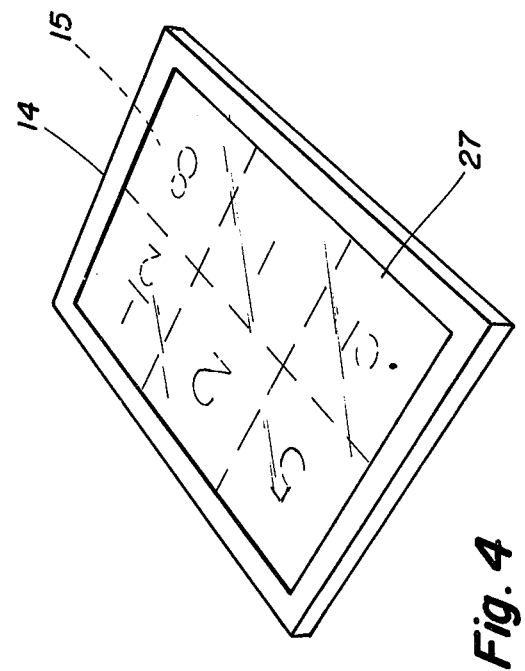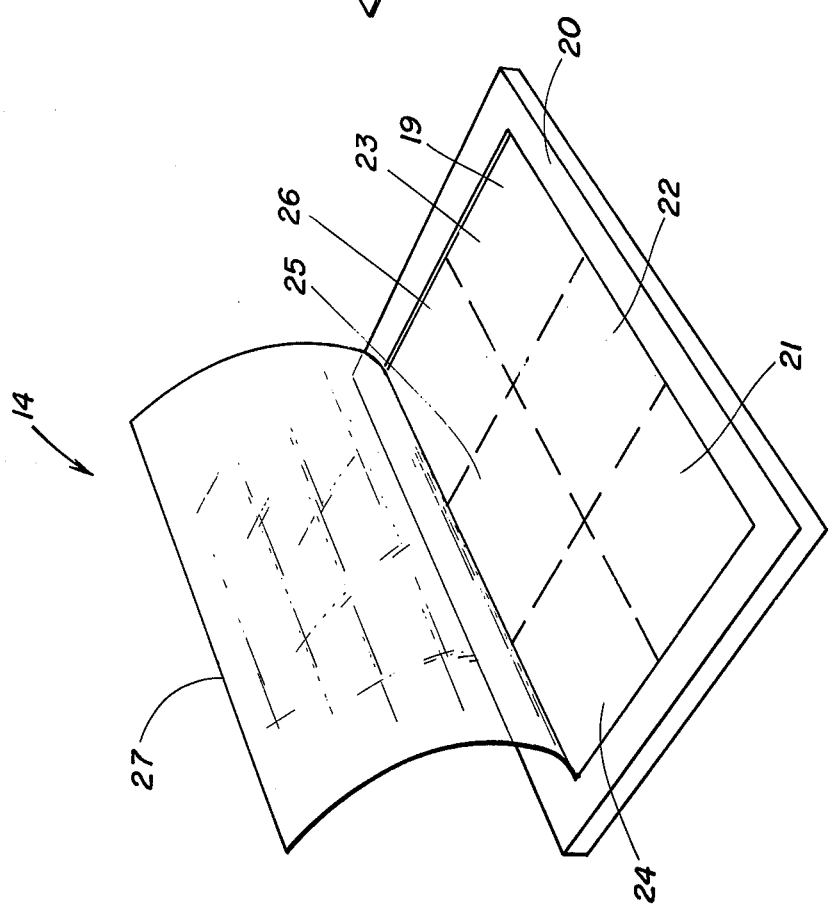

COLOR-ASSIST TEACHING AID AND METHOD THEREFOR

BACKGROUND OF THE INVENTION

1. Field of the Invention:

This invention is in the field of visual teaching aids.

2. Description of the Prior Art:

Traditional methods of teaching students include tests wherein the student writes in longhand the answer to a particular question posed by the teacher. With the advent of the computer, it has been possible to shorten the student's response from a longhand answer to simply filling in blocks which are subsequently processed by computer-assisted paper readers. In the case of a handicapped or young student, the response of the student may be influenced by the manner in which the student is to respond. For example, the student may find it easier to respond by holding up an object in a certain manner rather than by writing or printing the response on paper.

In the U.S. Pat. No. 3,304,627 issued to Cella, there is shown an educational device for indicating to the teacher at a glance the answers to multiple-choice questions which have been selected by the various students in a class. Other devices, such as shown in the U.S. Pat. Nos. 3,450,408; 2,562,633 and 1,405,010, disclose teaching devices or games wherein the participant employs multi-colored blocks or strips. The teaching device disclosed in U.S. Pat. No. 3,154,863 allows the student to check for himself any given answer offered in response to the posed question. Another device which is shown in U.S. Pat. No. 2,959,871 allows for the determination of a person's type of personality by using two different sets of colors and forms and having the person use some part of each set in making a selection. A teaching device which requires inputs from both the teacher and student is shown in U.S. pat. No. 3,500,555 issued to C. A. Best.

It will be seen by reviewing the aforementioned patents that it is old in the art for a student to respond using a particular color. Likewise, it is old in the art to communicate via a visual display. The present invention includes the novel feature of color coding an answer corresponding to the color coding of a displayed answer.

SUMMARY OF THE INVENTION

One embodiment of the present invention is a method of teaching comprising the steps of asking a student a question, displaying a plurality of answers with at least one of the answers correctly corresponding to the question, coding each of the answers differently from the remainder of the answers, providing multi-sided responding means operable to display a plurality of codes, one at a time, with the code corresponding to answer codes displayed during the displaying step, and directing the student to answer the question by displaying the code of the responding means corresponding to the code of the one answer.

Another embodiment of the present invention is a teaching aid for use with a visual aid projecting means comprising an answer transparent sheet having thereon a plurality of answers and adapted to be positioned on the means to project the answers, a color grid transparent sheet sized to fit adjacent the answer transparent sheet on the means, the grid transparent sheet having a plurality of portions, each of a different color, positioned with one of each of the answers appearing in one each of the portions, and responding means having a plurality of sides to display a plurality of colors, one at a time, corresponding to each color of the color grid transparent sheet.

It is an object of the present invention to provide a new and improved teaching device.

Yet another object of the present invention is to provide a new and improved method of teaching.

Related objects and advantages of the present invention will be apparent from the following description.

BRIEF DESCRIPTION OF THE DRAWINGS

FIG. 2 is an enlarged perspective view of the color grid transparency carrier positioned on the projector of FIG. 1.

FIG. 3 is a perspective view of an answer sheet transparency.

FIG. 4 is a perspective view of the answer sheet transparency of FIG. 3 mounted in the carrier of FIG. 2.

DESCRIPTION OF THE PREFERRED EMBODIMENTS

Figure 1:
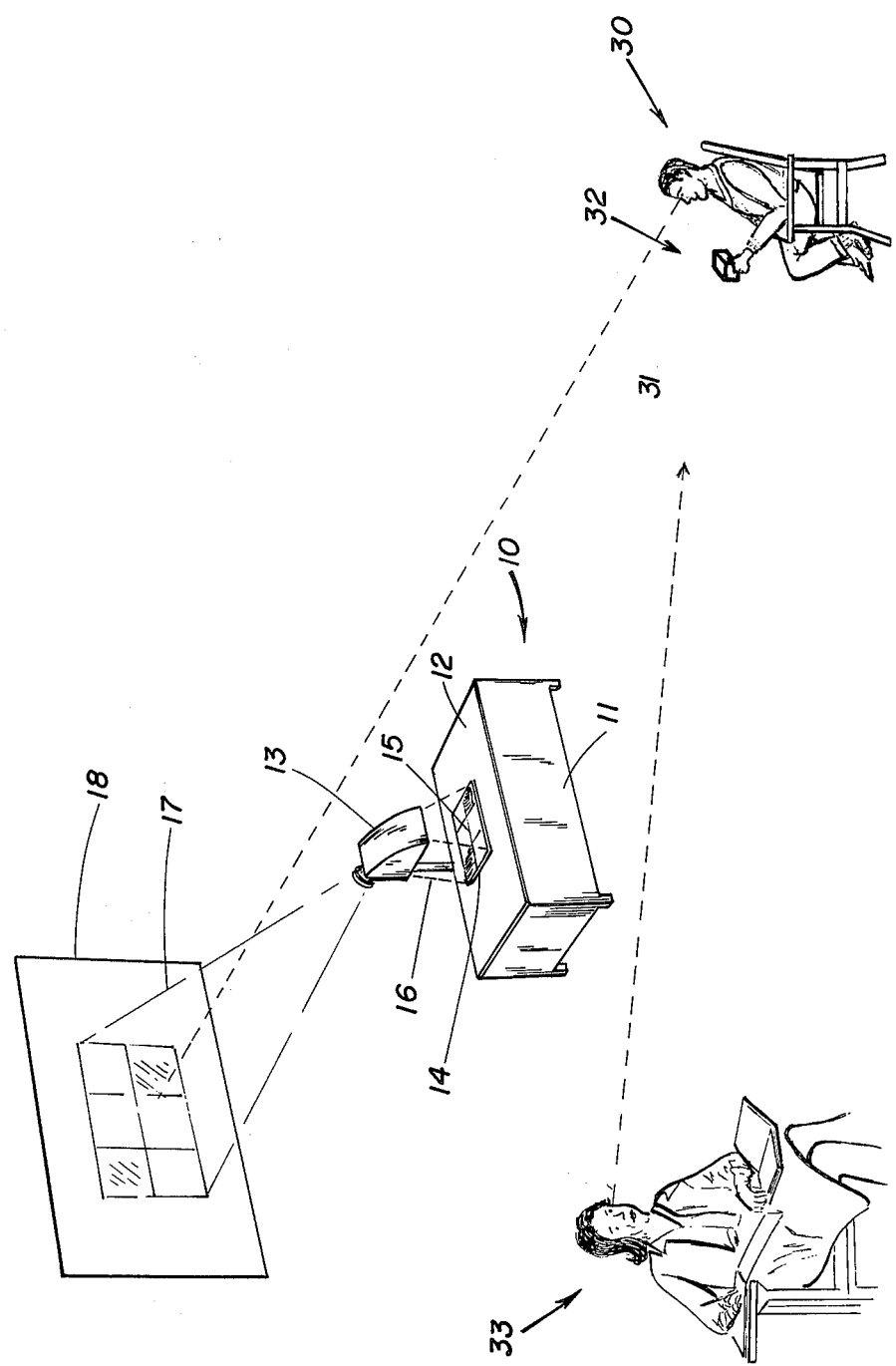
FIG. 1 is a diagram of a teacher and student using the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a conventional projector 10 having a main housing 11 with a light source therein projecting upwardly through surface 12 into reflector 13. Positioned atop surface 12 is a color-coded transparency carrier 14 having an answer sheet transparency 15 secured therein. Thus, the images formed by transparencies are reflected upwardly along beams 16 through the reflector 13 and via beams 17 onto screen 18.

Carrier 14 (FIG. 2) includes a first transparent sheet 19 attached to and surrounded by an opaque border 20. A color grid is provided on sheet 19 so that a plurality of portions, each of a different color, exist on sheet 19. For example, in the embodiment shown in FIG. 2, sheet 19 includes six different portions 21 through 26, each of a different color. A second transparent sheet 27 is hingedly attached at one end to sheet 19 and is sized to completely extend over sheet 19.

Transparency 15 (FIG. 3) is an answer sheet having thereon a plurality of answers and adapted to be positioned between sheets 19 and 27. Transparency 15 is divided into the same number of portions as found on sheet 19. For example, in the event sheet 19 is provided with six separate colored portions, then six separate answers are provided on transparency 15 thereby associating a separate color on sheet 19 with a separate answer on transparency 15.

The method of teaching includes the step of having the teacher ask the students a question. A plurality of answers are then displayed on screen 18 with at least one of the answers correctly corresponding to the question. For example, the question might be "What is the answer to 10 divided by 2?" The teacher would insert the answer transparency 15 containing the correct answer into the transparency carrier 14 and then position the carrier on projecting means 10 so that the answers are projected onto screen 18. Each answer would be coded differentially from the remaining answers in that each of the answers found on transparency 15 would be associated with a color found on the grid transparent sheet 19. The colors and corresponding answers are projected onto screwn 18 and then viewed by student 30. The student is provided with a multi-sided responding means or block 32 having a color on each side of the block corresponding to the colors found on sheet 19 and projected onto screen 18. Thus, if the color associated with the number 2 is red as shown on screen 18, then the student displays the side 31 having the color red thereon of block 32 to teacher 33. The block contains a plurality of codes or colors which correspond to the answer codes or colors displayed on screen 18 by the projecting means. The student is directed to answer the question by displaying the correct color of block 32 to the teacher corresponding to the color or code of the answer. Thus, the teacher knows at a glance the various answers of the students. Likewise, the teacher knows immediately if the student's attention is directed to something other than the teaching subject under consideration.

The coding step includes the step of associating each of the answers with a different color. Likewise, providing the multi-sided responding means includes the step of associating each of the codes of the responding means with a different color but the same colors as the colors associated with the answers. The directing step includes the step of directing the students to display to the teacher the color of the responding means identical to the color associated with the correct answer. Likewise, the displaying step includes the step of projecting a color grid and plurality of answers on a display surface so that each of the answers appear on a different colored section of the grid. The directing step also includes the step of directing the students to display a side of the block with the color corresponding to the color associated with the correct answer.

It will be obvious from the above description that the present invention provides immediate recognition by the teacher on whether the student knows the correct answer. The "Color Grid" and the "Answer Block" are relatively inexpensive to produce. A number of answer sheets may be conveniently stored until the corresponding question is posed to the students. In the event the same question is to be asked a number of times, then the color grid should be either rotated 180° or turned completely over so as to associate a different color with the correct answer each time the question is posed to the students. The same answer sheet may be used for a number of different questions. For example, the answer sheet could include the names of a number of cities and then a number of different questions could be asked about the same city thereby allowing for the repeated use of the same answer sheet.

The instant invention is particularly useful in teaching music and a variety of other subjects, such as, math, language, and social studies. Language will not be a barrier to using the present invention. For example, the question may be phrased in one language whereas the answer is phrased in another language. It is expected that the teaching aid disclosed herein will greatly improve the learning ability of a slow-learning or handicapped child. The testing would not rely totally on how well a child reads and writes but instead would measure the child's knowledge and ability to respond. It will be further obvious that the above invention prevents the student from quickly filling in the blanks on a computer readable sheet merely to quickly complete the test. In many cases, a two-part question is asked and the student will spend all of his time on the first part of the question thereby failing to answer the second part of the question. The present invention eliminates this problem and allows the teacher to inform the student of the answer to the first part of the question before the second part of the question is asked. The majority of students are screen oriented and thus, the present invention is easy for the student to understand. One advantage of the teaching aid disclosed herein is the enormous saving of paper, the elimination of pencil sharpening and the distractions during a typical test. The child will be taught to think quickly and then realize that he has to abide by his decision. A student with muscle coordination difficulties will be able to achieve a much higher grade using the instant invention.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are described to be protected.

The invention claimed is:
1. A method of teaching comprising the steps of:
    asking a student a question;
    positioning a plurality of answers marked on a transparent sheet adjacent a transparent color grid so each of said answers are associated with a different color;
    projecting said plurality of answers along with said color grid onto a display surface with at least one of said answers correctly corresponding to said question;
    providing a hand-held responding means having a plurality of sides, each side bearing a different color, operable to display a plurality of colors, one at a time, corresponding to each color of said color grid projected on said display surface; and,
    directing said student to answer said question by displaying to the teacher the side of said responding means bearing the color which is identical to said color of said one answer.
2. The method of claim 1 wherein; said positioning step includes the substeps of:
    (a) first opening a transparency holder which includes a transparent cover and a transparent base by moving at least partially apart said transparent cover from said transparent base with said color grid provided on said base;
    (b) next, inserting said plurality of answers marked on said transparent sheet within said holder; and
    (c) then closing said holder with said transparent sheet located between said cover and said base.
3. A teaching aid for use with a visual aid projecting means comprising:
    an answer transparent sheet having thereon a plurality of answers and adapted to be positioned on said projecting means so as to project said answers;

a color grid holder having a transparent cover and transparent base sized to receive said answer transparent sheet between said cover and said base on said means, said grid holder having a plurality of portions, each of a different color, positioned with one each of said answers appearing in one each of said portions; and, a hand-held block having a plurality of sides each bearing a different color to display a plurality of colors, one at a time, corresponding to each color of said color grid holder.

4. The teaching aid of claim 3 wherein said transparent base is hingedly attached to said transparent cover with said plurality of portions, each of a different color, located on said base.

* * * * *